UNITED STATES PATENT OFFICE.

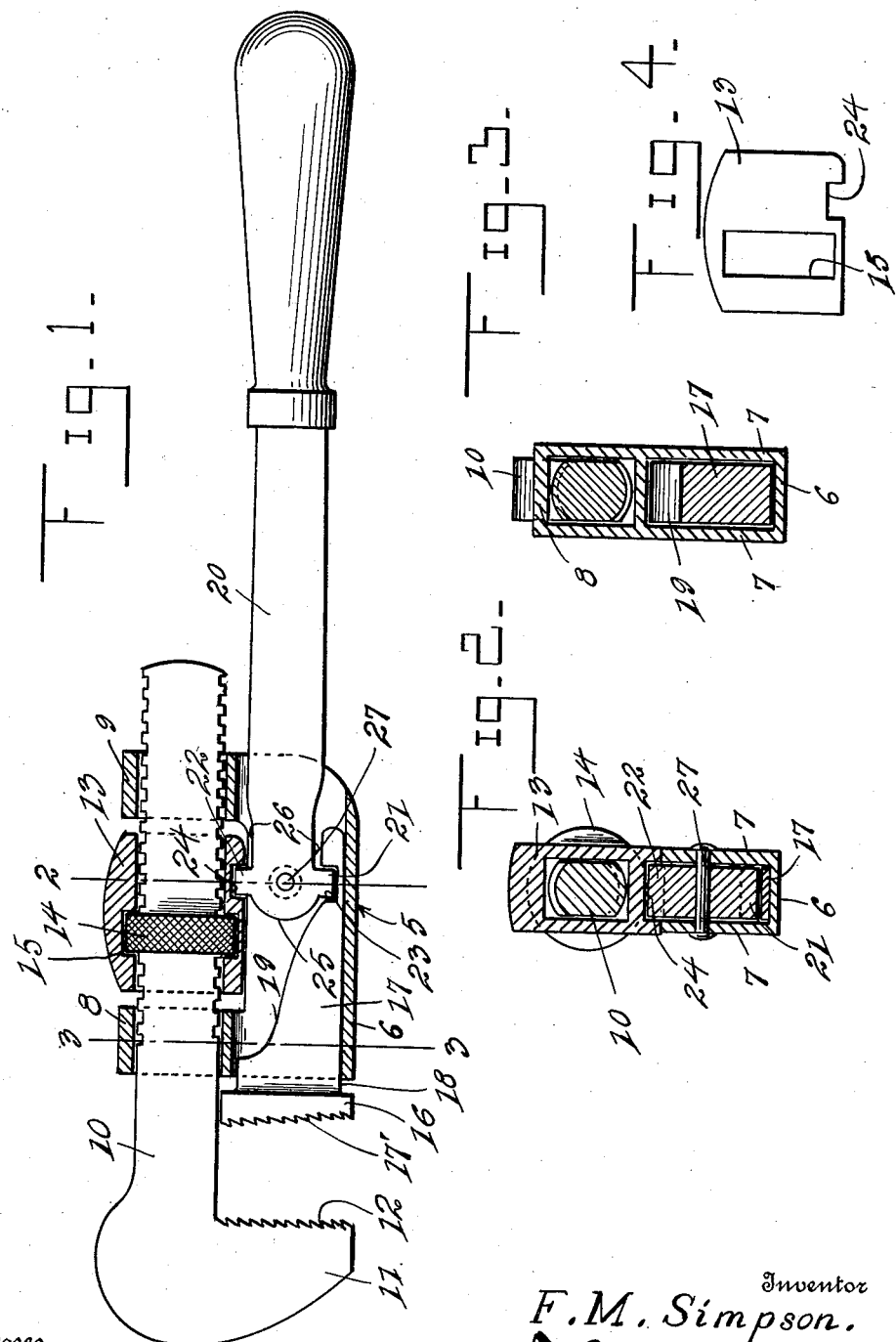

FRANK M. SIMPSON, OF ALAMEDA, CALIFORNIA.

PIPE-WRENCH.

1,101,343.   Specification of Letters Patent.   Patented June 23, 1914.

Application filed August 21, 1913. Serial No. 786,019.

*To all whom it may concern:*

Be it known that I, FRANK M. SIMPSON, a citizen of the United States, residing at Alameda, in the county of Alameda and State of California, have invented certain new and useful Improvements in Pipe-Wrenches; and I do hereby declare the following to be a full, clear, and exact description of the invention, such as will enable others skilled in the art to which it appertains to make and use the same.

This invention comprehends improvements in pipe wrenches and relates more particularly to those of the type wherein a pair of coacting jaws are provided which, when the handle is forced in one direction will automatically grip the pipe and which when the handle is forced in the other direction will automatically release their hold upon the pipe.

The primary object of the invention is to provide a pipe wrench of this nature which shall be of extremely simple construction, very efficient, and strong and durable.

The invention also aims to generally improve inventions of this type to render them more practical, useful, and commercially desirable.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a longitudinal sectional view, partly in elevation, through my improved wrench, Fig. 2 is a section taken on the plane of line 2—2 of Fig. 1, Fig. 3 is a section taken on the plane of line 3—3 of Fig. 1, and, Fig. 4 is a side elevation of the nut frame.

In the preferred embodiment of my invention I provide a main frame or body, designated in its entirety by the numeral 5, and comprising a main portion which is U-shaped in cross section, having a bottom wall 6 and side walls 7; and rectangular guide loops 8 and 9 formed upon the upper edges of the side walls adjacent their extremities. The sides of the loops are disposed in the same plane as the side of the main portion of the frame or body. An outer jaw having a shank 10 and a laterally extending head 11 formed with upwardly facing teeth 12, is provided, and the shank 10 which is threaded upon its upper and lower edges extends through the guide loops 8 and 9. A sleeve or nut frame 13 is mounted upon the shank 10 between the guide loops and is somewhat shorter than the distance between the same. A nut 14 is positioned in an opening 15 formed in the sleeve or frame 13 and is provided with internal threads for engagement with the threads on the shank. It will be evident that should the sleeve 13 be held stationary a rotation of the nut will move the shank 10 longitudinally in one direction or the other. For coöperation with the outer jaw I provide an inner jaw having a head 16 and a shank 17 which works within the main portion of the main frame or body 5 of the wrench. The head is formed with downwardly facing teeth 17' and the shank tapers toward its inner end. The bottom 18 of the shank is straight for engagement with the bottom 6 of the body and the top edge 19 is inclined downwardly and inwardly.

A handle 20 extends into the main portion of the body through the inner end thereof and is formed with lugs or laterally extending projections 21 and 22 adjacent its inner end which fit within pockets 23 and 24 formed in the opposed faces of the shank 17 and nut frame 13, respectively. The extremity of the handle is rounded between the lugs 21 and 22, as indicated by the numeral 25 and is of a reduced diameter upon the inner sides of the lugs, as indicated by the numeral 26. A pivot pin 27 extends through the sides 7 of the main frame and through the inner extremity of the handle, as clearly shown in Figs. 1 and 2.

When the jaws have been properly adjusted by means of the nut 14 and placed over a pipe, a downward movement of the handle 20 will cause the jaws to be forced toward each other and bite into the pipe. The handle rotates slightly about the pivot pin 27, forces the inner jaw outwardly, and draws the outer jaw inwardly, as will be apparent upon reference to Fig. 1.

From the foregoing description taken in connection with the accompanying drawings, it will be apparent that I have provided a very simple, practical, and efficient pipe-wrench which will, when properly adjusted, automatically bite into a pipe when the handle is forced in one direction and automatically release its hold upon the pipe when the handle is forced in the other direction. The automatic releasing feature prevents much wear upon the teeth of the jaws when the wrench is being swung so as to take a new hold. It is obvious that if desired, the teeth could be dispensed with so as to adapt the wrench for use in connection with nuts rather than as a pipe wrench.

It is to be understood that while I have shown and described the preferred embodiment of my invention, I do not wish to be limited to this exact construction, combination, and arrangement of parts, but may make such changes as will fall within the spirit and scope of the invention as claimed.

Having thus described my invention, I claim:—

1. A wrench comprising a hollow body having guide loops formed thereon, an outer jaw having a shank extending through said guide loops and formed with threads, a sleeve surrounding the shank, a nut also surrounding the shank and working within an opening formed in the sleeve, said sleeve being located intermediate the guide loops, an inner jaw having a shank slidable within the body, a handle extending into one end of the body and formed adjacent its outer end with lugs, the opposed faces of the sleeve and shank of the inner jaw being formed with pockets to receive said lugs, and a pivot pin extending through the outer end of the handle and fixed at its ends in the body.

2. A wrench including a body which is U-shaped in cross section and open at each end, guide loops formed upon the free longitudinal edges of the sides of the body adjacent the ends thereof, the sides of the guide loops being disposed in the plane of the sides of the body, an outer jaw including a shank and a head, the shank extending through the guide loops and being threaded upon its edges, a sleeve mounted upon the shank intermediate the guide loops, said sleeve being of a shorter length than the distance between the loops and being formed with a transverse opening and a socket, a nut threaded upon the shank and extending through the opening formed in the sleeve, an inner jaw having a head and a shank, said last mentioned shank extending into the body through the outer end thereof and tapering toward its inner end, the second mentioned shank being formed with a socket, a handle extending into the body through the inner end thereof and formed with laterally extending lugs and adapted to be received within said sockets, and a pivot pin extending through the outer end of the handle and having its ends fixed in the side walls of the body, a rotation of the handle about the pivot pin causing the jaws to be moved toward or away from each other.

In testimony whereof I affix my signature in presence of two witnesses.

FRANK M. SIMPSON.

Witnesses:
L. SWENSON,
M. A. MILLER.

---

Copies of this patent may be obtained for five cents each, by addressing the "Commissioner of Patents, Washington, D. C."